3,778,387
ACTIVATED CARBON WITH ANTIOXIDANT PROPERTIES AND A METHOD OF PREPARING THE SAME

John Emery Urbanic, Pittsburgh, and Robert Francis Sutt, Coraopolis, Pa., assignor to Calgon Corporation, Pittsburgh, Pa.
No Drawing. Filed June 21, 1971, Ser. No. 155,269
Int. Cl. C01b 31/08
U.S. Cl. 252—428                     5 Claims

ABSTRACT OF THE DISCLOSURE

An activated carbon with antioxidant properties is prepared by first acid washing the carbon to remove ash, then air oxidizing the carbon, and finally impregnating the carbon with a ketone.

BACKGROUND OF THE INVENTION

The present invention is directed to an activated carbon with antioxidant properties. More particularly, it relates to an activated carbon with antioxidant properties made by acid washing the carbon, followed by air oxidation of the acid-washed carbon and finally impregnating the carbon with a ketone.

It is well known that activated carbon can act as an excellent catalyst for oxidation reactions. For example, activated carbon has been used as a catalyst in the contact process of making sulfuric acid. The oxidation of sulfur dioxide to sulfur trioxide and the reaction of the sulfur trioxide with water to form sulfuric acid are greatly increased by activated carbon. Activated carbon also catalyzes the oxidation reaction of organic hydrocarbons.

It is also well known that activated carbon is an excellent adsorbent for many compounds, especially organic compounds. Activated carbon has been used for adsorbing cyanide dyes and the like from waste streams. In addition, activated carbon has found widespread use in adsorbing tar, nicotine, cyanide and the like from tobacco smoke.

However, there are many applications where it is desirous to adsorb the compounds without subsequent oxidation or to purify a stream of gas without oxidizing it. For example, in analyzing cigarette smoke for nitric oxide, it is necessary to remove interfering compounds from the smoke before analysis. However, the use of conventional activated carbon for removing the interfering compounds is not desirable since it oxidizes the nitric oxide to nitrogen dioxide. For example, see the article "Direct Determination of Nitric Oxide in Cigarette Smoke" by J. E. Urbanic and R. F. Sutt, presented at the 23rd Tobacco Chemists Research Conference, Philadelphia, Pa., Oct. 22, 1969. In addition, in the purification of higher ketones, aldehydes and ethers, conventional activated carbon cannot be utilized since it enhances the formation of dangereous peroxides.

It is, therefore, an object of this invention to provide an activated carbon with antioxidant properties.

SUMMARY OF THE INVENTION

We have invented a novel activated carbon with antioxidant properties and a method for making the same. Our method comprises treating conventional activated carbon in the following manner. The activated carbon is first acid washed to reduce the inherent oxidation catalyst present in the ash content. The acid-washed carbon is then air oxidized to decrease the catalytic activity of the carbon surface. Finally, the acid-washed, air-oxidized carbon is treated with a ketone to further reduce the catalytic activity of the carbon.

Activated carbon prepared in accordance with our invention may be employed in any application where an activated carbon with antioxidant properties is desirable. For example, when it is necessary to purify mixtures of easily oxidizable compounds such as nitric oxide and air or sulfur dioxide and air, they may be brought into contact with our activated carbon without the subsequent oxidation reactions taking place.

The first step in making the antioxidant carbon of our invention is acid washing. The carbon is acid washed to remove as much of the inherent oxidation catalysts from the ash as possible. Ash is comprised of the metal constituents, such as iron, which are normally present in most activated carbon after it has been made. Since many of these metals increase oxidation reactions, they must be removed. Acid washing removes most of the metals that are easily accessible and found on the surface of the carbon. The ash content generally varies from about 4 to 9 percent by weight for granular activated carbon and from 10 to 25 percent by weight for pulverized activated carbon. Analysis of the ash content from a typical granular activated carbon is shown in Table 1 following. The carbon analyzed in Table 1 was a sample of Type BPL granular activated carbon manufactured by Pittsburg Activated Carbon.

CHEMICAL AND SPECTROCHEMICAL ANALYSES OF GRANULAR ACTIVATED CARBON

[Total ash, 5.46%, Water soluble ash, 0.089%; Acid soluble ash, 0.964%]

| Constituent: | Percent of total ash | Percent of water washed carbon ash | Percent of acid washed carbon ash |
| --- | --- | --- | --- |
| $SiO_2$ | 41.41 | 31.51 | 33.56 |
| $Al_2O_3$ | 44.03 | 48.39 | 46.38 |
| $Fe_2O_3$ | 7.36 | 6.19 | 2.75 |
| $CaO$ | 2.95 | 2.32 | 0.39 |
| $MgO$ | 2.42 | 1.15 | 0.96 |
| $TiO_2$ | 0.50 | 0.50 | 0.50 |
| $K_2O$ | 1.0 | 1.0 | 1.0 |
| $Na_2O$ | 0.75 | 0.20 | 0.25 |
| $SrO$ | 0.10 | 0.08 | 0.05 |
| $MnO$ | 0.08 | 0.08 | 0.07 |
| $NiO$ | 0.05 | 0.02 | 0.02 |
| $Cr_2O_3$ | 0.15 | 0.10 | 0.10 |
| $BaO$ | 0.10 | 0.08 | 0.05 |
| $B_2O_3$ | 0.005 | 0.003 | 0.003 |
| $CuO$ | 0.02 | 0.01 | 0.01 |
| $V_2O_5$ | 0.10 | 0.07 | 0.08 |
| $MoO_3$ | 0.003 | 0.003 | 0.002 |
| $PbO$ | 0.001 | 0.001 | 0.001 |
| $SnO_2$ | 0.003 | 0.001 | 0.001 |
| $BeO$ | 0.002 | 0.002 | 0.001 |
| $Ag_2O$ | 0.0005 | <0.0005 | <0.0005 |
| $CoO$ | 0.01 | 0.005 | 0.005 |
| $ZrO_2$ | 0.01 | 0.01 | 0.01 |

The activated carbon is acid washed by contacting the carbon with a dilute solution of an acid. Some of the useful mineral acids are hydrochloric acid, nitric acid and sulfuric acid. The preferred mineral acid is hydrochloric acid. The acid washing is accomplished by pumping a 0.5 to 10 percent solution of the mineral acid through a bed of activated carbon, usually a columnar bed. The solution may be pumped for any where from one hour to twenty-four hours or more, depending on the amount of ash in the carbon being treated, the concentration of acid being used, and the flow rate of the acid. In addition, the acid washing may be done at any temperature up to the boiling temperature of the acid solution. The important step is contacting the activated carbon with the acid solution. The parameters of contact time, acid strength, flow rate, temperature, and the like, will be varied for the individual system as is realized. In fact, the acid washing of activated carbon is a process well known to the industry. Therefore, the above description should not be considered as limiting the acid washing step. Any other acid washing process which removes the inherent oxidation catalyst from the carbon is acceptable and within the scope of this invention.

After acid washing, the carbon is rinsed with water to remove the excess acid. Rinsing is usually accomplished by passing distilled or deionized water through the bed of activated carbon until the excess acid is removed. The acid-washed, rinsed carbon is then dried and is now usable in the second step of the process.

The second step in preparing antioxidant activated carbon is air oxidation. By air treating the activated carbon prior to exposure to the oxidizable compounds such as hydrocarbons and sulfur dioxide, the surface is made less reactive towards these compounds and thus, oxidation is prevented. For example, it was found that oxygen-free activated carbon prepared by calcination at 1750° C. in nitrogen showed a 50 percent increase in oxidative activity when compared to carbon prepared in a normal manner.

The air oxidation step is generally accomplished by heating the acid-washed carbon in the presence of air. The carbon may be treated at temperatures ranging from 100° C. to 600° C. for periods of time ranging from five minutes to one week or more. Temperature used and the time of treatment are somewhat interdependent as would be expected.

For example, in one experiment we air oxidized a sample of activated carbon for thirty minutes at 250° C. and found an increase in the antioxidant properties as compared to a similar sample which was not air oxidized. In another example, we air oxidized a sample of activated carbon for one hundred thirty-eight hours at 175° C. in a forced draft oven. In this case, the air-oxidized carbon had a much greater antioxidant property than a similar sample which was not air oxidized. In a third example, we air oxidized the carbon for three hours at 150° C. and obtained improved antioxidant properties. As can be seen from these examples, the temperature and time may be varied over a wide range.

As mentioned supra, the purpose of the air oxidation step is to satisfy the carbon's natural affinity for oxygen. The term air oxidation as used herein therefore means any process which satisfies the carbon's demand for oxygen.

The final step in preparing the activated carbon of our invention is ketone impregnating. We have found that ketone impregnating further reduces the activity of the acid-washed, air-oxidized carbon towards oxidation reactions. Ketone impregnating is accomplished by simply mixing the acid-washed, air-oxidized activated carbon with the ketone and then drying the so treated carbon until it contains the desired amount of ketone impregnation. The amount of ketone initially mixed with the acid-washed, air-oxidized carbon depends upon the amount of ketone impregnation that is desired in the final product. We have made carbons containing from two to twenty percent by weight residual ketone impregnation. All of these carbons showed greatly reduced oxidation characteristics. However, we prefer to use carbons containing from four to eight percent by weight residual ketone.

The amount of ketone initially mixed may, therefore, vary from 25 percent by weight of the carbon up to 100 percent by weight of the carbon or greater. However, we have found that in order to obtain a final product with a uniform ketone impregnation that it is desirable to use at least 50 percent by weight ketone, based on the weight of the carbon being treated. It is preferred that an excess of ketone over the weight of carbon be employed; however, amounts much greater than 100 percent are not any more beneficial.

After the acid-washed, air-oxidized carbon is mixed with the ketone, it is heated to remove the ketone until the carbon contains the desired amount of residual ketone impregnation. The carbon may be heated and the ketone removed at various temperatures. The temperature range used will depend on the boiling point of the ketone being utilized. For example, when the ketone is acetone, the temperature range will be from about 75° C. to about 125° C. In addition, the ketone may also be removed at low temperatures by placing the activated carbon acetone mixture under a vacuum. There are also other methods for removing the excess ketone that are readily apparent to one skilled in the art. The important factor is not which ultimate method is used to remove the excess ketone but only that it yields a somewhat uniformly ketone-impregnated carbon. Therefore, by ketone impregnating is meant mixing the acid-washed, air-oxidized activated carbon with a ketone and subsequently removing the excess ketone until the desired amount of residual ketone is present.

We have prepared the antioxidant carbon of our invention using many different ketones. However, the prepared ketones are the low boiling ketones such as acetone, methyl ethyl ketone and methyl isobutyl ketone. Of the preferred ketones, acetone is the most preferred and methyl ethyl ketone the second most preferred.

Th acid-washed, air-oxidized ketone impregnated activated carbon of our invention possesses excellent antioxidant properties. However, the activated carbon of our invention still maintains its excellent adsorption properties for removing impurities. We have performed numerous experiments demonstrating these properties. The following examples are illustrative of our invention but should not be deemed to limit the same.

The examples were evaluated using the following general procedure. An analytical method for the determination of nitric oxide in cigarette smoke by ultraviolet spectroscopy required the use of an activated carbon capable of removing interfering organic compounds from the smoke without oxidizing nitric oxide. In this test, the smoke was drawn through a trap (7 mm. dia. x 30 mm. long) containing 12 x 30 U.S. sieve granular activated carbon and into a 10 cm. gas cell of the ultraviolet spectrophotometer. Calibration of the instrument and other analytical procedures are described in the paper "Direct Determination of Nitric Oxide in Cigarette Smoke," supra. The test gas used in the following examples was cigarette smoke containing 46 mcg. of nitric oxide per 35 cc. puff.

Example 1

Type CPG acid-washed activated carbon and type BPL non-acid washed activated carbon manufactured by Pittsburgh Activated Carbon were used in the previously described apparatus. CPG carbon allowed detection of 38 mcg. of nitric oxide per puff (83% of influent) while BPL allowed only 29 mcg. (63%).

Example 2

One hundred grams of type BPL activated carbon described in Example 1 was exposed to 2.5l of air per minute at 250° C. for 30 minutes in a laboratory rotary furnace. After cooling, a representative portion was placed in the carbon trap and tested as in Example 1. In this case, the oxidized BPL carbon allowed detection of 33 mcg. of nitric oxide (72%).

Example 3

One hundred grams of CPG activated carbon described in Example 1 was admixed with 50 cc. of acetone and stirred until mixture appeared dry. The mixture was heated for one hour at 100° C. The cooled product contained 6 percent by weight acetone. A representative portion of the acetone-impregnated CPG was tested as in Example 1. 42 mcg. of nitric oxide per puff were detected (91%).

Example 4

Type CPG activated carbon oxidized as in Example 2 and impregnated with acetone as in Example 3 was tested as in Example 1. In this case, 45 mcg. of nitric oxide were detected (98%). This value demonstrates that catalytic oxidation of nitric oxide by the carbon has been eliminated.

The activated carbon used in the above examples maintained their adsorption properties for removing impurities.

We claim:

1. An antioxidant activated carbon prepared by washing activated carbon with a mineral acid, oxidizing the activated carbon in the presence of air at a temperature of from 100° C. to 600° C., and impregnating the activated carbon with acetone or methyl ethyl ketone.

2. A method of preparing activated carbon having antioxidant properties comprising washing activated carbon with a mineral acid, oxidizing the activated carbon in the presence of air at a temperature of from 100° C. to 600° C., and impregnating the activated carbon with acetone or methyl ethyl ketone.

3. A method as in claim 2 wherein the ketone is acetone or methyl ethyl ketone.

4. A method as in claim 2 wherein the carbon is impregnated with from two to twenty percent by weight ketone.

5. A method as in claim 4 wherein the carbon is impregnated with from four to eight percent by weight ketone.

References Cited

UNITED STATES PATENTS

| | | | |
|---|---|---|---|
| 2,201,050 | 5/1940 | Oberle | 252—423 |
| 2,245,579 | 6/1941 | Davis | 252—423 |
| 3,399,968 | 9/1968 | Amodeo et al. | 252—428 |
| 2,992,895 | 7/1961 | Feustel et al. | 23—2 S |

FOREIGN PATENTS

| | | | |
|---|---|---|---|
| 1,351,661 | 12/1963 | France | 252—444 |
| 186,406 | 11/1966 | U.S.S.R. | 252—428 |
| 1,052,371 | 3/1959 | Germany | 23—207 |

DANIEL E. WYMAN, Primary Examiner

P. E. KONOPKA, Assistant Examiner

U.S. Cl. X.R.

55—68, 73, 74; 131—261 R; 252—421, 444, 445; 423—245, 460